Dec. 10, 1929.  J. W. BRENKERT ET AL  1,738,943
STEREOPTICON PROJECTOR
Filed April 9, 1928  2 Sheets-Sheet 1

Inventor
Joseph W. Brenkert,
Karl Brenkert,
By
Attorneys

Dec. 10, 1929. J. W. BRENKERT ET AL 1,738,943
STEREOPTICON PROJECTOR
Filed April 9, 1928  2 Sheets-Sheet 2

Inventor
Joseph W. Brenkert,
Karl Brenkert,
By
Attorneys

Patented Dec. 10, 1929

1,738,943

UNITED STATES PATENT OFFICE

JOSEPH W. BRENKERT AND KARL BRENKERT, OF DETROIT, MICHIGAN

STEREOPTICON PROJECTOR

Application filed April 9, 1928. Serial No. 268,664.

The present invention pertains to a novel stereopticon projector, and the principal object is to provide a device wherein the slide holders may be adjusted according to requirements.

It is often desirable to tilt the slide holders, in view of the particular location of the machine or distance from the screen, in order to obtain projection from the two slide holders upon a fixed given area of the screen. The object of the invention is accomplished first by mounting the slide holders on a rotatable section provided in the front wall of the projector housing. Secondly, the slide holders are adapted to be turned on their centers independently of each other and of the rotatable section. Obviously adequate devices are furnished for making the several adjustments.

The invention also embodies a new form of dissolving shutters wherein one of the slide holders is gradually obscured simultaneously with the gradual exposure of the other. The shutters preferably move in a vertical path so that the effect of the screen is that of the new view gradually unfolding itself over the old view from the top or bottom thereof.

The invention is fully disclosed by way of example in the following description and in the accompanying drawings, in which—

Reference to these views will now be made by use of like characters which are employed to designate corresponding parts throughout.

Figure 1:
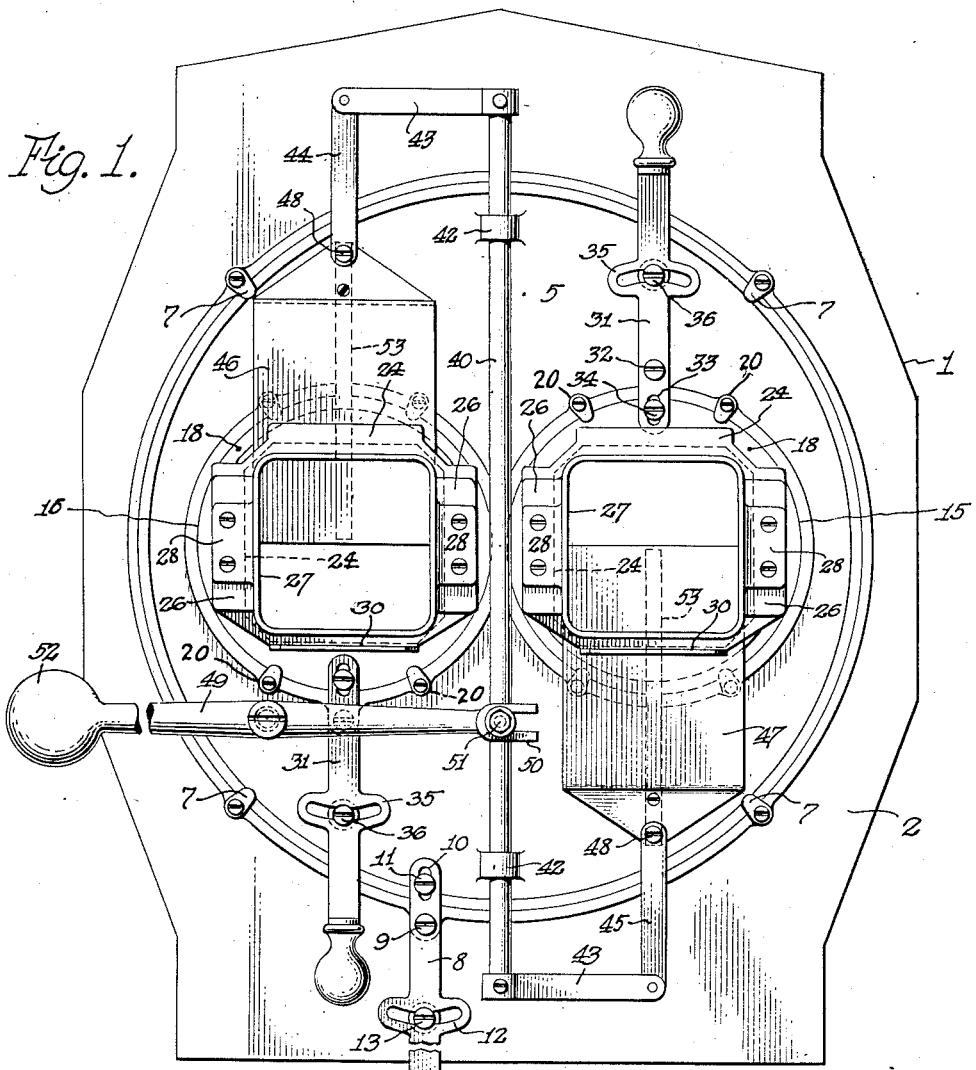
Figure 1 is a front elevation of the machine.

The housing 1 of the machine is preferably of the conventional shape and contains a suitable light source which need not be described herein. The front wall 2 of the housing is formed with a circular flange 3 defining a circular opening 4 of cross section in which is inserted a circular wall section 5. The edge of the section 5 has a rib 6 having a thickness equal to the height of the flange so that the plate may be held in place by clips 7 secured to the flange and extending over the rib. The plate 5 carries the lens holders in a manner presently to be described and is rotated for adjustment by means of a lever 8 pivotally mounted on the front wall 2 at a point 9 intermediate its ends.

The lever extends a short distance over the section 5 and is there formed with a slot 10 receiving a pin 11 fixed to the section 5. At the other side of its pivot point the lever is formed with a transverse slotted portion 12 receiving a set screw 13 mounted in the wall 2. This serves as a limiting means for the lever in its pivotal movement, since the section 5 does not require more than slight adjustment in any case. When the proper adjustment has been found, it is secured by tightening the set screw.

For the purpose of supporting the slide holders and slides, the section 5 is formed with a pair of circular openings 15 with a marginal chamfer or countersink 16 surrounded by an enlarged or thickened portion 17 of the section 5. In each such opening is rotatably mounted a holder 18 having a flange 19 received in the chamfer 16, and the holder is held in the opening by clips 20 secured to the thickened portion 17 and extending over the flange 19 as shown more clearly in Figure 1. A lens frame 21 is inserted in each opening from the rear side thereof and serves to contain a condensing lens 22.

Figure 2:
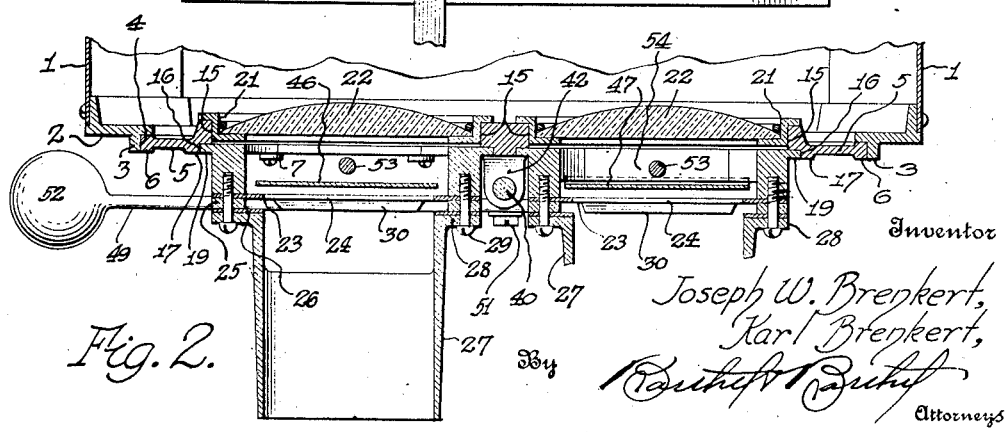
Fig. 2 is a horizontal section of the front wall thereof.
Figure 3:
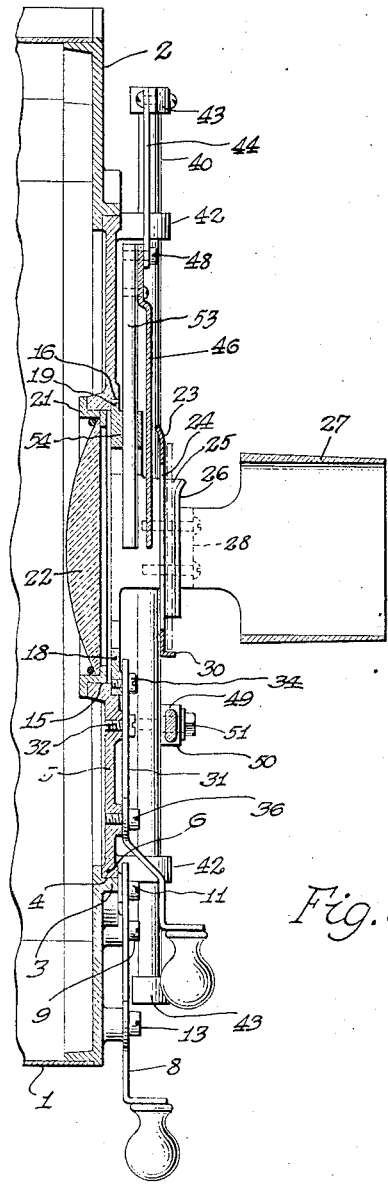
Fig. 3 is a vertical section of the front wall.
Figure 4:
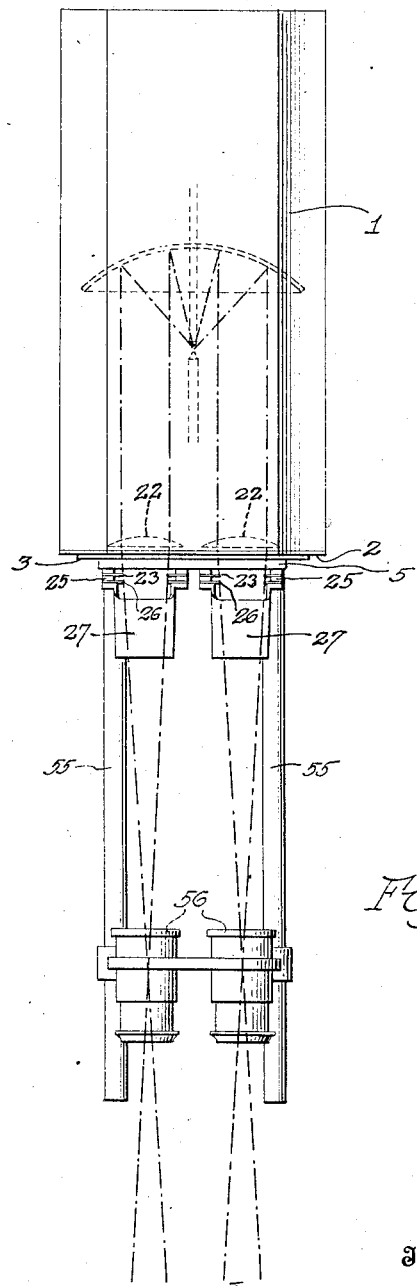
Fig. 4 is a plan view.

On the face or forward end of each holder is secured a plate 23 with a suitable opening 24 for determining the shape of the projection on the screen. Over the plate 23 is applied a spacing ring 25, and to each ring are secured a pair of vertical strips 26 projecting into the confines of the ring from opposite sides thereof and forming a gate in cooperation with the plate 25. Finally, a shield 27 is placed next to the strips 26 and has lateral flanges 28 which cover these strips. This entire assembly on the ring is secured by screws 29 as shown more clearly in Figure 2. The lower end of the plate 23 has a stop or ledge 30 for supporting the slide inserted in the gate as shown in dotted lines in Figure 3.

It has already been indicated that the slide holders 18 are rotatable with respect to the wall section 5. Adjustment of the slide holders in this manner, i. e. by rotation on their centers, is effected by pivoting a lever 31 to the section 5 at a point 32 adjacent the holder opening. It will be seen in Figure 1 that one of these levers is positioned below the opening and the other above the opening. This arrangement is made in view of convenience in assembling and operation, but otherwise the two levers are identical. Each lever has an end projecting slightly over the corresponding holder and is there slotted at 33 for receiving a pin 34 carried by the holder. At the other side of its pivot point each lever is formed with a transverse slotted portion 35 receiving a set switch 36 mounted on the section 5. After the desired adjustment of the lens holder has been secured by means of the lever, this adjustment is fixed by tightening the set screw.

The shutter assembly is built on a main rod 40 slidable vertically between the holders in ears 42 formed on the section 5. To the ends of this rod are secured arms 43, the upper one extending to a point above the center of one of the holders, and the other extending to a point below the center of the other holder. A link 44 is suspended from the free end of the upper arm 43, and a similar member 45 stands upwardly from the free end of the lower member 43. To the lower end of the link 44 and the upper end of the link 45 are secured shutters 46 and 47 respectively adapted to move behind the plates 23 and obstruct the openings 24 thereof. The connection between the arms 43 and the links 44 and 45 is preferably pivotal in order to permit the adjustments of the slide holders in the manner described. The links 44 and 45 are in turn preferably connected to the respective shutters by screws 48 so that the linkage may be made rigid after adjustment.

The rod 40 is reciprocated by a lever 49 pivotally mounted on the section 5 and having one end forked at 50 for receiving a stud 51 on the rod 40. The remaining end of this lever is equipped with a knob 52 which serves as a handle. It will be seen in Figure 1 that the leading edges of the shutter may be brought into horizontal alignment across the centers of the holders, so that on operation of the lever 49, one of the holders will be gradually screened in a given direction while the other is gradually exposed in the opposite direction. This manner of operation has the effect of showing the new view gradually overlapping the former view. The shutters 46 and 47 are guided in their path by rods 53 secured respectively to the upper and lower end thereof and slidable through bosses 54 formed respectively at the upper and lower points of the corresponding holders.

The machine further includes a pair of rods 55 extending forwardly from the housing for the purpose of supporting focusing lens holders 56 for cooperating with the condensing lens 22, but these need not be described in detail herein.

Although a specific embodiment of the invention has been illustrated and described, it will be understood that various alterations in the details of construction may be made without departing from the scope of the invention as indicated by the appended claims.

What we claim is:—

1. A stereopticon projector comprising a housing having a front wall, slide holders mounted on said front wall, a rod slidably mounted on the wall, a shutter slidable in one of said holders through one end thereof, another shutter slidable in the other holder through the opposite end thereof, and connecting means between each of said shutters and the corresponding end of said rod.

2. A stereopticon projector comprising a housing having an adjustable front wall, a pair of slide holders carried by said wall, a rod slidably mounted on the wall, a shutter slidable in one of said holders through one end thereof, another shutter slidable in the other holder through the opposite end thereof, and connecting means between each of said shutters and the corresponding end of said rod.

3. A stereopticon projector comprising a housing having an adjustable front wall, a pair of slide holders carried by said wall, a rod slidably mounted on the wall, a shutter slidable in one of said holders through one end thereof, another shutter slidable in the other holder through the opposite end thereof, connecting means between each of said shutters and the corresponding end of said rod, and a lever pivoted on said wall and attached to said rod.

In testimony whereof we affix our signatures.

JOSEPH W. BRENKERT.
KARL BRENKERT.